United States Patent
Kuroda et al.

(10) Patent No.: US 6,507,784 B1
(45) Date of Patent: Jan. 14, 2003

(54) ROAD MAP DISPLAY DEVICE AND REDOCE MEDIA FOR USE IN THE SAME

(75) Inventors: Nobuhide Kuroda, Okazaki (JP); Kunihiro Yamada, Okazaki (JP); Mitsuhiro Nimura, Okazaki (JP); Hiroyoshi Masuda, Okazaki (JP); Hidenori Nagasaka, Okazaki (JP)

(73) Assignee: Aisin AW Co., Ltd., Anjo (JP)

( * ) Notice: Subject to any disclaimer, the term of this patent is extended or adjusted under 35 U.S.C. 154(b) by 0 days.

(21) Appl. No.: 09/959,973

(22) PCT Filed: Mar. 13, 2001

(86) PCT No.: PCT/JP01/01942
§ 371 (c)(1),
(2), (4) Date: Dec. 27, 2001

(87) PCT Pub. No.: WO01/69537
PCT Pub. Date: Sep. 20, 2001

(30) Foreign Application Priority Data

Mar. 14, 2000 (JP) ......................................... 2000-070397

(51) Int. Cl.[7] ..................... G01C 21/00; G01C 21/30; G06F 165/00
(52) U.S. Cl. ..................... 701/208; 701/207; 340/990; 340/988; 340/995
(58) Field of Search .................... 701/208, 207, 701/200; 73/178 R; 340/988, 990, 995

(56) References Cited

U.S. PATENT DOCUMENTS 5,161,886 A 11/1992 De Jong et al.

(List continued on next page.)

FOREIGN PATENT DOCUMENTS

| EP | 0 752 687 A2 | 1/1997 |
| JP | 1-263688 | 10/1989 |
| JP | 2-267583 | 11/1990 |
| JP | A-9-179489 | 7/1997 |
| JP | A-9-237037 | 9/1997 |

OTHER PUBLICATIONS

Patent application 2001/0022585A1—Endo et al. Sep. 20, 2001—Bird's–eye view forming method map display apparatus and navigation system.*

Patent application 2001/0039474A1—Hayashi et al. Nov. 8, 2001—map information display device and navigation apparatus.*

Primary Examiner—William A. Cuchlinski, Jr.
Assistant Examiner—Olga Hernandez
(74) Attorney, Agent, or Firm—Oliff & Berridge, PLC

(57) ABSTRACT

A road map display device including a road map information memory for memorizing road map data on a two-dimensional coordinate and a detection device for detecting a present position and a travel direction of an automotive vehicle, wherein the two-dimensional coordinate of the road map data is read out from the information memory in accordance with the present position and travel direction of the vehicle detected by the detection device and displayed in the form of a plane view on a screen of a display unit. In the road map display device, trapezoid conversion parameters are determined on a basis of a conversion formula for converting the two-dimensional coordinate of the road map to a trapezoid, coordinate for display of a perspective view in such a manner that an upper side of a square two-dimensional coordinate is contracted relatively to a lower side of the two-dimensional coordinate, and the road map data included in a reverse trapezoid coordinate defined by a reverse conversion formula of the conversion formula are read out from the road map information memory and introduced into a trapezoid coordinate defined by the trapezoid conversion parameters such that the road map data are displayed in the form of a perspective view on the screen of the display unit.

9 Claims, 8 Drawing Sheets

U.S. PATENT DOCUMENTS

| | | | |
|---|---|---|---|
| 5,426,584 A | * 6/1995 | Kamimura et al. | 180/169 |
| 5,742,924 A | 4/1998 | Nakayama | |
| 5,793,310 A | * 8/1998 | Watanabe et al. | 340/990 |
| 5,862,498 A | * 1/1999 | Koyanagi et al. | 340/995 |
| 5,897,604 A | 4/1999 | Takahashi et al. | |
| 5,964,810 A | * 10/1999 | Hirano et al. | 340/995 |
| 6,011,494 A | * 1/2000 | Watanabe et al. | 340/990 |
| 6,012,014 A | * 1/2000 | Koyanagi et al. | 701/207 |
| 6,141,014 A | * 10/2000 | Endo et al. | 345/427 |
| 6,346,942 B1 | * 2/2002 | Endo et al. | 345/427 |
| 6,356,835 B2 | * 3/2002 | Hayashi et al. | 340/988 |

* cited by examiner

BASIS POINT FOR IMAGE DISPLAY

BASIS POINT FOR IMAGE DISPLAY

US 6,507,784 B1

ROAD MAP DISPLAY DEVICE AND REDOCE MEDIA FOR USE IN THE SAME

FIELD OF THE INVENTION

The present invention relates to a road map display device adapted for use in a navigation apparatus for an automotive vehicle, and particularly to a road map display device in which a two-dimensional coordinate of road map data is converted into a trapezoid coordinate for display of a perspective view to display a road map near the present position of the vehicle in an expanded scale and to display a distant road map in a wide range.

TECHNICAL BACKGROUND

In the publication of Japanese Patent No. 2869472 issued on Mar. 10, 1999, there has been proposed a road map display device in which a portion of a road map is displayed by coordinate conversion in perspective in the form of a projective view looked at from an ostensible view point located above the portion of the road map on the earth's surface outside of a vehicle. In the road map display device, a projective conversion processing to a coordinate value of road map data is executed to convert road map data on a two-dimensional plane to data for display of a bird's eye view and to project the coordinate value of the road map data on a display screen. Accordingly, in the road map display device, calculation of a trigonometric function is required in accordance with a look down angle. and three-dimensional calculation is required in consideration with the height of the view point. For this reason, the coordinate conversion processing of the road map data becomes complicated. This results in an increase of processing load of the road map and delay of conversion processing of the data for the bird's eye view, causing difficulty in use of the display device.

SUMMARY OF THE INVENTION

To eliminate the difficulties described above, the present invention was made to provide a road map display device capable of rapidly converting a two-dimensional. coordinate of road map data to a trapezoid coordinate for display of a perspective view by simple conversion processing without execution of complicated processing for coordinate convention so that a road map in a travel direction of an automotive vehicle is displayed in the form of a deep perspective view on a screen of a display unit.

According to the present invention, there is provided a road map display apparatus including a road map information memory for memorizing road map data on a two-dimensional coordinate, detection means for detecting a present position and a travel direction of an automotive vehicle, read-out means for reading out the two-dimensional coordinate of the road map from the information memory in accordance with the present position and travel direction of the vehicle detected by the detection means, and image display means for displaying the read out two-dimensional coordinate in the form of a planar view on a screen, wherein coordinate conversion means is provided to convert a square two-dimensional coordinate to a trapezoid coordinate for display of a perspective view on a two-dimensional plane in such a manner that an upper side of the two-dimensional coordinate is appropriately contracted relatively to a lower side of the two-dimensional coordinate, and wherein the read-out means is arranged to read out the two-dimensional coordinate of the road map data corresponding with a perspective view to be displayed on the screen of the image display means, wherein the coordinate conversion means is arranged to convert the two-dimensional coordinate read out by the read-out means to the trapezoid coordinate, and wherein the image display means is arranged to display the converted trapezoid coordinate in the form of a perspective view on the screen.

According to an aspect of the present invention, there is provided a road map display apparatus including a road map information memory for memorizing road map data on a two-dimensional coordinate; detection means for detecting a present position and a travel direction of an automotive vehicle, read-out means for reading out the two-dimensional coordinate of the road map data from the information memory in accordance with the present position and travel direction of the vehicle detected by the detection means, and image display means for displaying the read out two-dimensional coordinate in the form of a plane view on a display screen, wherein the road map display apparatus comprises parameter memory means for memorizing trapezoid conversion parameters preliminarily determined on a basis of a conversion formula for converting the two-dimensional coordinate of the road map data to a trapezoid coordinate for display of a perspective view in Such a manner that an upper side of a square two-dimensional coordinate is contracted relatively to a lower side of the coordinate; and introduction means for obtaining the road map data included in a reverse trapezoid coordinate corresponding with a trapezoid coordinate defined by the trapezoid conversion parameters from the parameter memory means and for introducing the road map data into the trapezoid coordinate such that the road map data are displayed in the form of a perspective view on the screen of the image display means.

According to another aspect of the present invention, there is provided a road map display apparatus including a road map information memory for memorizing road map data on a two-dimensional coordinate, detection means for detecting a present position and a travel direction of an automotive vehicle, read-out means for reading out the two-dimensional coordinate of the road map from the information memory in accordance with the present position and travel direction of the vehicle detected by the detection means, and image display means for displaying the read out two-dimensional coordinate in the form of a plane view on a screen. wherein coordinate conversion means is provided to convert a square two-dimensional coordinate to a trapezoid coordinate for display of a perspective view on a two-dimensional plane in such a manner that an upper side of the two-dimensional coordinate is appropriately contracted relatively to a lower side of the two-dimensional coordinate in a condition where a diagonal line connecting one end of the upper side of the two-dimensional coordinate to the other end of the lower side of the two-dimensional coordinate is retained straight, wherein the read-out means is arranged to read out the two-dimensional coordinate of the road map data corresponding with a perspective view to be displayed on the screen of the image display means and wherein the coordinate conversion means is arranged to convert the two-dimensional coordinate read out by the read-out means to the trapezoid coordinate so that the image display means displays the converted trapezoid coordinate in the form of a perspective view on the screen.

According to a further aspect of the present invention, there is provided a road map display apparatus including a road map information memory for memorizing road map data on a two-dimensional coordinate; detection means for detecting a present position and a travel direction of an automotive vehicle, read-out means for reading out the two-dimensional coordinate of the road map data from the information memory in accordance with the present position and travel direction of the vehicle detected by the detection means and image display means for displaying the read out two-dimensional coordinate in the form of a plane view on a display screen, wherein the road map display apparatus comprises parameter memory means for memorizing trapezoid conversion parameters preliminarily determined on a basis of a conversion formula for converting the two-dimensional coordinate of the road map data to a trapezoid coordinate for display of a perspective view in such a manner that an upper side of a square two-dimensional coordinate is contracted relatively to a lower side of the coordinate in a condition where a diagonal line connecting one end of the upper side of the two-dimensional coordinate to the other end of the lower side of the two-dimensional coordinate is retained straight; and introduction means for obtaining the road map data included in a reverse trapezoid coordinate corresponding with a trapezoid coordinate defined by the trapezoid conversion parameters from the parameter memory means and for introducing the road map data into the trapezoid coordinate such that the road map data are displayed in the form of a perspective view on the screen of the image display means.

According to a another aspect of the present invention, there is provided a record media adapted for use in a road map display apparatus including a road map information memory for memorizing road map data on a two-dimensional coordinate; detection means for detecting a present position and a travel direction of an automotive vehicle. read-out means for reading out the two-dimensional coordinate of the road map data from the information memory in accordance with the present position and travel direction of the vehicle detected by the detection means, and image display means for displaying the read out two-dimensional coordinate in the form of a plane view on a display screen. wherein the record media is programmed to determine trapezoid conversion parameters on a basis of a conversion formula for converting the two-dimensional coordinate of the road map data to a trapezoid coordinate for display of a perspective view in such a manner that an upper side of a square two-dimensional coordinate is contracted relatively to a lower side of the coordinate and to read out the road map data included in a reverse trapezoid coordinate corresponding with a trapezoid coordinate defined by the trapezoid conversion parameters from the parameter memory means for introducing the road map data into the trapezoid coordinate such that the road map data are displayed in the form of a perspective view on the screen of the image display means.

In the road map display apparatus. the trapezoid conversion parameters preliminarily determined on a basis of the conversion formula are stored in the form of a table so that the two-dimensional coordinate obtained from the road map data can be converted to a trapezoid coordinate for display of a perspective view in a simple manner and that the road map data memorized in the road map information memory can be rapidly displayed in the form of a deep perspective view on the screen of the display unit.

BRIEF DESCRIPTION OF THE DRAWINGS

In the drawings:

FIG. 2(*b*) is an explanatory view of a trapezoid coordinate for display of a perspective view converted from the two-dimensional coordinate:

PREFERRED EMBODIMENT

Figure 1:
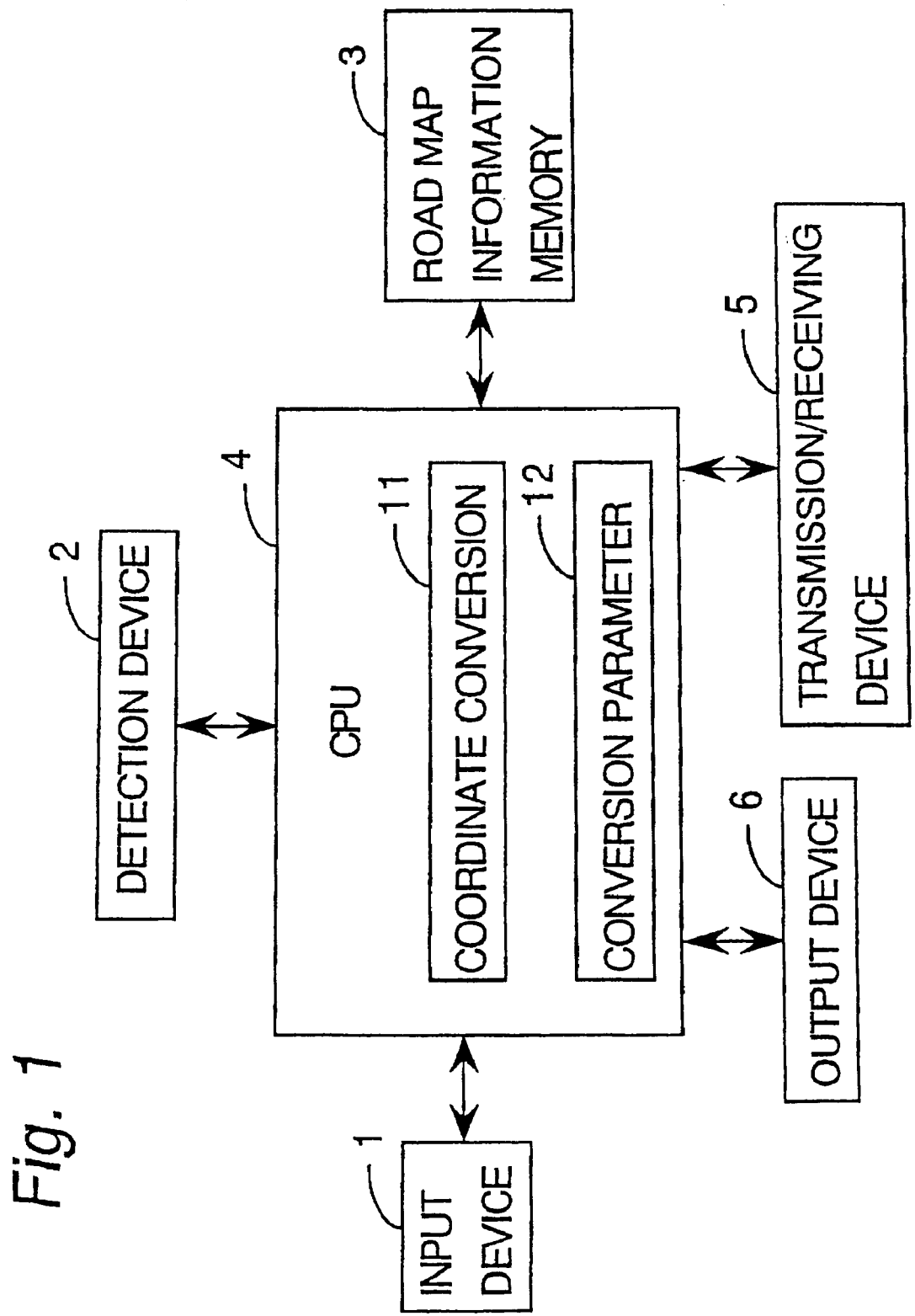
FIG. 1 is a schematic illustration of a road map display device in accordance with the present invention in the form of a block diagram.

Hereinafter a preferred embodiment of a road map display device according to the present invention will be described with reference to the accompanying drawings. Illustrated in FIG. 1 is a road map display device adapted for use in a navigation apparatus for an automotive vehicle. The road map display device includes an input device 1, a detection device 2 for detecting a present position and a travel direction of an automotive vehicle, a road map information memory 3 for memorizing road map data, a table of trapezoid conversion parameters, an information for guide of a travel route, and a program for display of a road map and for guide of the travel route, a central processing unit 4 for executing display-processing of the road map, search-processing of the travel route, voice-guide processing necessary for guide of the travel route and control processing of the whole system, a transmission/receiving device 5 for transmitting and receiving an information useful for travel of the vehicle such as road information, traffic information or the like and for transmitting and receiving an information as to a present position and a travel direction of the vehicle, and an output device 6 composed of an image display unit and a loudspeaker for issuing the information for guide of the travel route.

The input device 1 is used to select a road map for input of a destination and to apply a driver's instruction for navigation processing to the central processing unit 4. To effect these functions, the input device 1 is in the form of a remote controller such as a touch switch, a jog dial or the like used to input a destination by means of a telephone number or coordinated on the road map. The detection device 2 is composed of a position sensor utilizing a global positioning system (GPS) for detecting a present position of the vehicle, an absolute orientation sensor utilizing terrestrial magnetism for detecting a travel direction of the vehicle in an absolute orientation or a relative orientation sensor utilizing a steering sensor and a gyro-sensor for detecting a travel direction in a relative orientation.

The map information memory device 3 is in the form of an external memory device such as a CD-ROM for memorizing road map data in the form of a map mesh on two-dimensional coordinates a table of trapezoid conversion parameters used for converting the two-dimension coordinates for display of a perspective view, an information for guide of a travel route, searching data of the travel route, map-matching data, destination data, registration-spot data, image data of a branch-off point such as crossing point and the like necessary for navigation processing and for memorizing a program for execution of search processing of the travel route, a program for processing perspective display described later, a display output control program necessary for guide of a travel route, and a voice output control program necessary for guiding a travel route in dialog by voice-input. In addition, data necessary for the navigation processing may be stored in the central processing unit or in an optical disc such as a DVD-ROM or a magnetic disc such as a floppy disc.

The central processing unit 4 is composed of a CPU for executing various calculation processing, a flash memory for storing a program read out from the CD-ROM in the map information memory 3, a program for check of the flash memory, a ROM for storing a program for execution of renewal processing and a RAM for temporarily memorizing a searched route guide information such a point coordinate of the destination, the number of a road or the like and data for the calculation processing. The central processing unit further includes a frame memory for storing data for display on a display screen of the display device, a voice processor for executing dialog processing based on input of a voice from the input device 1 and for synthesizing a voice, a phrase and a sentence read out from the road map information memory 3 in response to a voice control signal from the CPU and converting them to analog signals for output of the loudspeaker, a communication interface for output/input of the data, and an input interface for input of detection signals applied from the sensors of the detection device 2.

The navigation apparatus includes a flash memory of relatively large capacity for reading out the program from the CD-ROM of the external memory device and a ROM of small capacity for storing a program for starting up processing of the program in CD-ROM. The flash memory is in the form of a nonvolatile memory in which memorized information is retained even when a Source of electricity is cut off. In start of the CE-ROM, the program of ROM is executed to check the program stored in the flash memory.

The transmission/receiving device 5 is composed of a GPS receiver for receiving information necessary for navigation in use of a global positioning system (GPS), a receiver for receiving traffic information from a vehicle information/communication system in use of a FM multiple broadcasting, a radio-wave beacon, an optical beacon and the like, a data transmission/receiving device for bilateral communication with an information center or another vehicle in use of a potable telephone, a personal computer or the like.

The output device 6 is provided to output navigation data processed in the central processing unit 4. The output device 6 includes a memory for memorizing image data for display of the navigation data processed in the central processing unit and the data memorized in the road map information memory 3, a display unit for displaying the image data memorized in the memory on a display screen, a printer for printing the data processed in the central processing unit 4 and the data memorized in the road map information memory 3, and a loudspeaker for generating a voice for guide of the travel route.

The display unit is composed of a liquid crystal display for displaying thereon an enlarged view of crossing, a destination name, a time, an arrow indicative of travel direction and the like based on display data of the road map and data for guide of the travel route processed in the central processing unit 4. The image data indicated on the display unit is in the form of a binary image which is displayed in an instructed extent on the display screen after the display data of the road map and the data for guide of travel route was received by the output device 6 from the central processing unit 4 through communication lines and memorized in the memory of the output device 6.

The display unit is mounted on an instrument panel near a driver's seat in the vehicle compartment and is useful for the driver to confirm the present position of the vehicle and to obtain information of the travel route.

Figure 2:
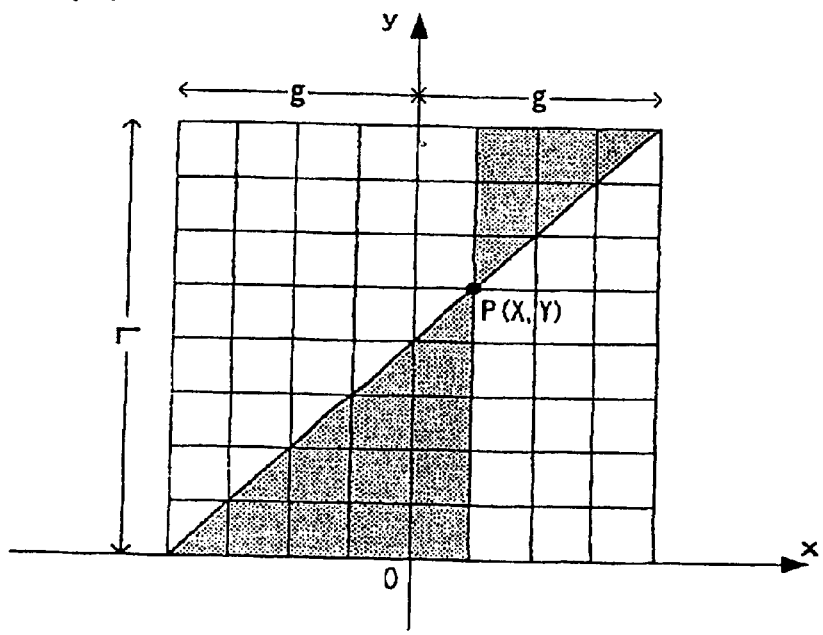
FIG. 2(*a*) is an explanatory view of a square two-dimensional coordinate used for obtaining a conversion formula for converting a two-dimensional coordinate to a trapezoid coordinate.
Figure 2:
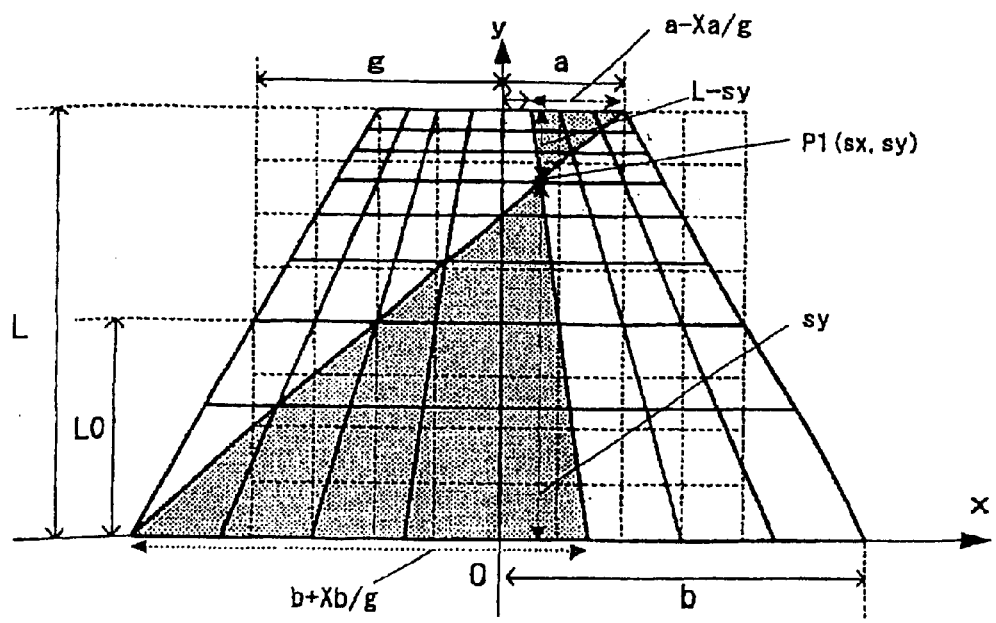

Hereinafter, a preferred embodiment of processing for converting a two-dimension coordinate to a trapezoid coordinate for display of a deep perspective view will be described with reference to FIGS. 2(a), 2(b) and FIGS. 3–6. In this embodiment, the following conversion formulas are calculated to define an arbitrary point P (X,Y) as a point P1 (sx, sy) on the trapezoidal coordinate after conversion thereby to convert the square two-dimensional coordinates shown in FIG. 2(a) to a trapezoidal coordinate for display of a deep perspective view shown in FIG. 2(b) in such a manner that a diagonal line connecting one end of an upper side of the square two-dimensional square coordinate to the other end of a lower side of the square two-dimensional coordinate is retained straight. In this instance, a pair of upper and lower triangles defined by a y-axis across the diagonal line at the point P on the square two-dimensional coordinate becomes similar figures. Accordingly, a ratio in length of the triangles in the y·axis direction becomes L−sy: sy as shown in FIG. 2(b).

At the next, the length of each bottom side of the triangles is obtained as follows. When a contraction ratio of the upper side (at a position of y=L) is taken into consideration, the length g before conversion is contracted to a length a after conversion. As a result, a length before conversion becomes a−Xa/g. Similarly, the bottom side of the lower triangle becomes b+Xb/g. As the ratio in side length of the similar triangles is equal, an equation, L−sy: sy=1−Xa/g: b+Xb/g is obtained.

On the other hand, a formula of the diagonal line before conversion is represented as described below/

$$Y = \frac{L}{2g}X + \frac{L}{2}$$

When the value X is eliminated from the above formula, the following equation is obtained.

$$sy = \frac{b \cdot L \cdot Y}{a \cdot L + (b-a)Y}$$

Based on the above formulas, a formula for obtaining a coordinate value sx on the x-axis is derived as described below. The half (½) of the lateral width of the trapezoid coordinate at a position y=sy is represented as follows.

$$b - \frac{b-a}{L}sy$$

When a contraction ratio at the position of y=sy is taken into consideration, the length g before conversion is defined after conversion as described above. Accordingly, the coordinate value X at the position y=sy on the x-axis before conversion is obtained as the coordinate value sx on the x-axis after conversion as described below.

$$X : sx = g : b - \frac{b-a}{L}sy$$

$$sx = \frac{X}{g}\left\{b - \frac{sy}{L}(b-a)\right\}$$

Thus, based on the foregoing conversion formulas, trapezoid conversion parameters for display of a perspective view is preliminarily determined and listed on the following table.

| Step | a | b | L | g | Compression ratio |
|---|---|---|---|---|---|
| 1 | 70 | 230 | 240 | 77.5 | 0.46 |
| 2 | 71 | 210 | 240 | 75 | 0.50 |
| 3 | 72 | 200 | 240 | 72.5 | 0.55 |
| 4 | 73 | 190 | 240 | 70 | 0.60 |
| 5 | 74 | 180 | 240 | 67.5 | 0.65 |
| 6 | 75 | 170 | 240 | 65 | 0.70 |
| 7 | 80 | 160 | 240 | 62.5 | 0.80 |
| 8 | 85 | 140 | 240 | 60 | 1.10 |
| 9 | 90 | 130 | 240 | 57.5 | 1.40 |
| 10 | 100 | 110 | 240 | 55 | 1.80 |

In this table, trapezoid conversion parameters for display of a perspective view and compression ratios in the y-axis direction are determined at ten steps. For example, as the value of a at the first step is small whereas the value k at the first step is large, road map data read out from the map information memory 3 is compressed at the upper region (a distance region) of the trapezoid coordinate and expanded at the lower region (a nearby region) of the trapezoid coordinate. In addition, the trapezoid conversion parameters and the compression ratios in the y-axis direction can be appropriately changed by selection of the trapezoid conversion parameters at each step.

Figure 3:
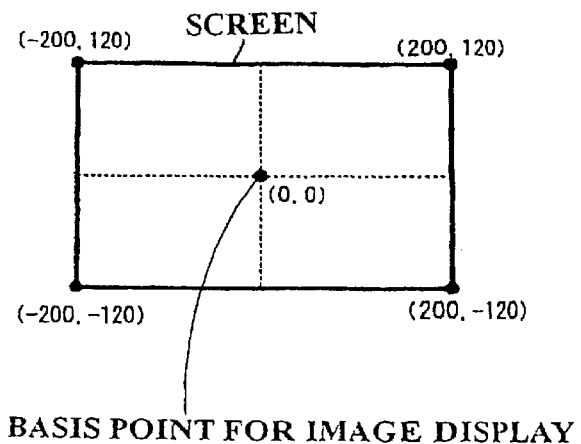
FIG. 3 is an explanatory view of absolute coordinates determined on a basis of a detected present position of an automotive vehicle.

Assuming that display of a perspective view at the first step has been selected by a user in a condition where the trapezoid coordinate for display of the perspective view were determined as described above, the central processing unit 4 reads out absolute coordinates of the present position of the vehicle detected by the detection device 2. (see FIG. 3) In this instance, the present position of the vehicle is displayed on the center of the display screen under control of the central processing unit. Thus, the center of the display screen is determined as a basis point (0, 0) of image display to define coordinates at the four corners of the display screen as shown in FIG. 3. When the road map data memorized in the form of a rectangular mesh of the road map is read out for display of the perspective view at the first step on the display screen, it is required to read out the road map data in a wide extent at the distance region and in a narrow extent at the nearby region. The reading extent of the road map data is determined by the following reverse conversion formula on a basis of the conversion formulas for display of the perspective view described above. In this instance, the coordinates at four corners on the display screen shown in FIG. 4 are obtained by the following reverse conversion formula to define the reading extent of the road map data as a reverse trapezoid coordinate.

$$X = \frac{g \cdot sx}{b - sy/L(b-a)}$$

$$Y = \frac{a \cdot L \cdot sy}{b \cdot L - sy(b-a)}$$

Figure 4:
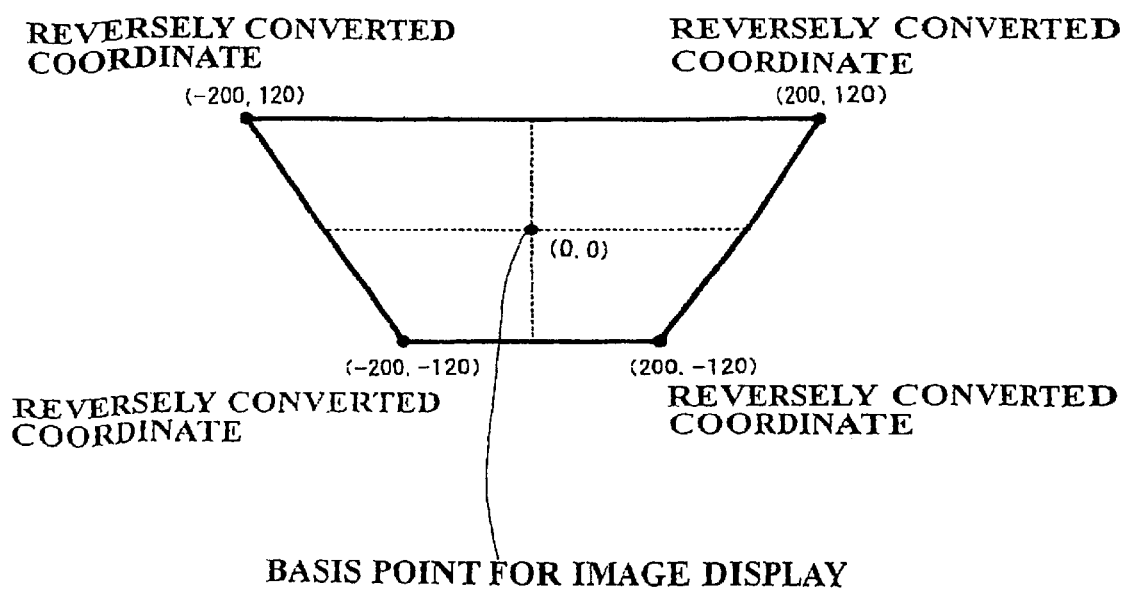
FIG. 4 is an explanatory view of a reverse trapezoid coordinate defined on a basis of reverse conversion of the absolute coordinates shown in FIG. 3.
Figure 5:
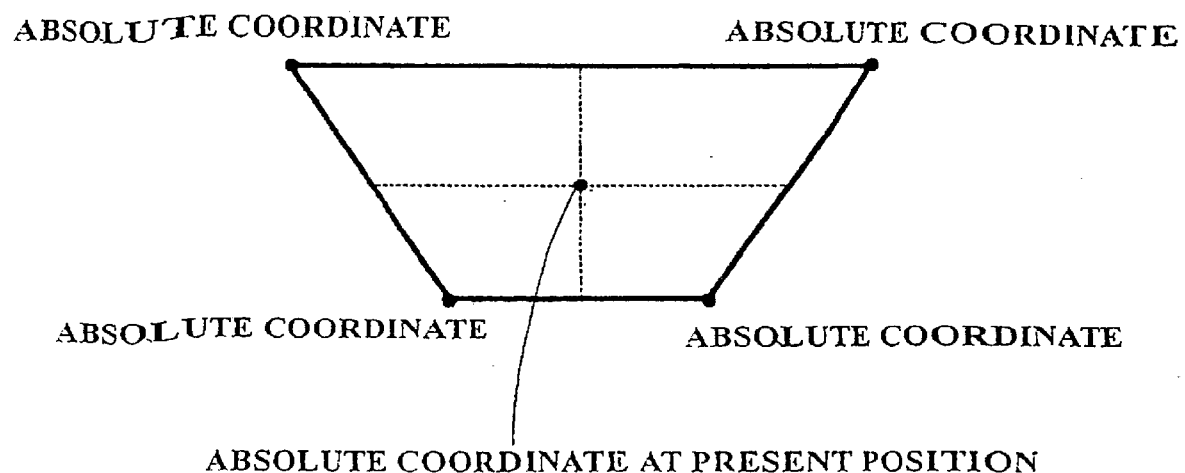
FIG. 5 is an explanatory view of absolute coordinates of the reverse trapezoid coordinate shown in FIG. 4.
Figure 6:
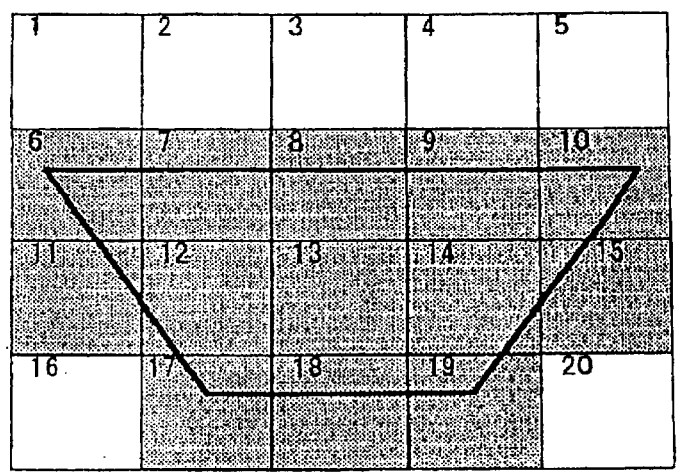
FIG. 6 is an explanatory view illustrating a condition of obtaining road map data included in the absolute coordinate of the reverse trapezoid coordinate shown in FIG. 5.

Subsequently, the coordinates at the four corners on the display screen shown in FIG. 4 are changed to absolute coordinates for defining a reverse trapezoid coordinate and the road map data included in the reverse trapezoid coordinate are read out. (see FIGS. 5 and 6) The absolute coordinates in the map data are changed to screen coordinates and substituted for the conversion formulas for display of the perspective view described above to convert the screen coordinates to the trapezoid coordinates for display of the perspective view shown in FIG. 2(b). Thus, the trapezoid coordinates are memorized in the frame memory and displayed on the display screen.

Figure 7:
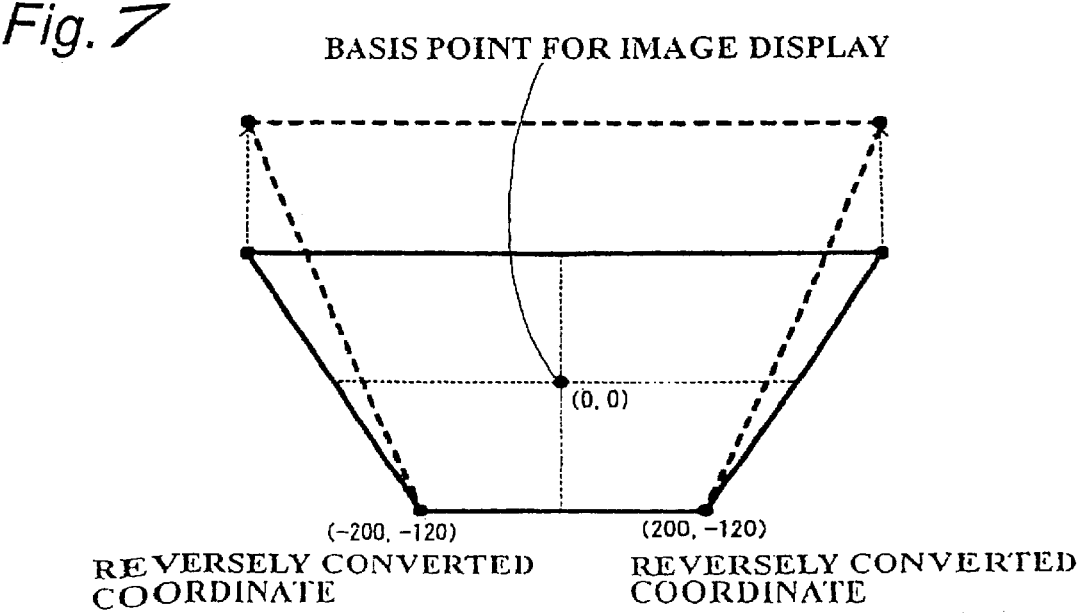
FIG. 7 is an explanatory view of a reverse trapezoid coordinate defined by a reverse conversion formula for displaying a road map of a distance area in the form of a perspective view.
Figure 8:
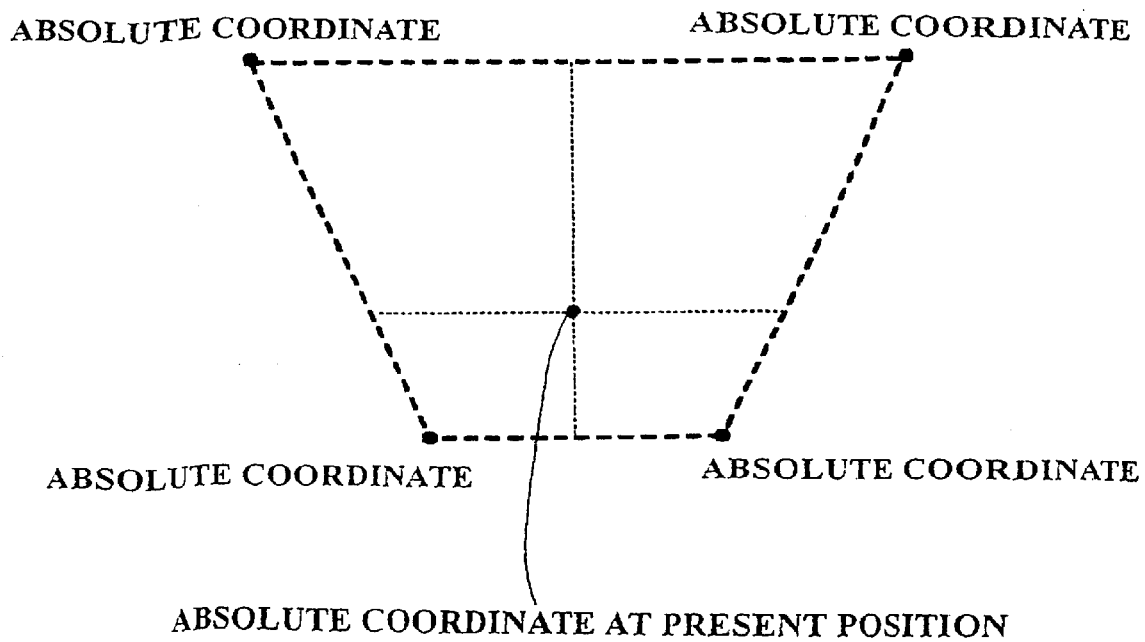
FIG. 8 is an explanatory view of absolute coordinates of the reverse trapezoid coordinate shown in FIG. 7.
Figure 9:
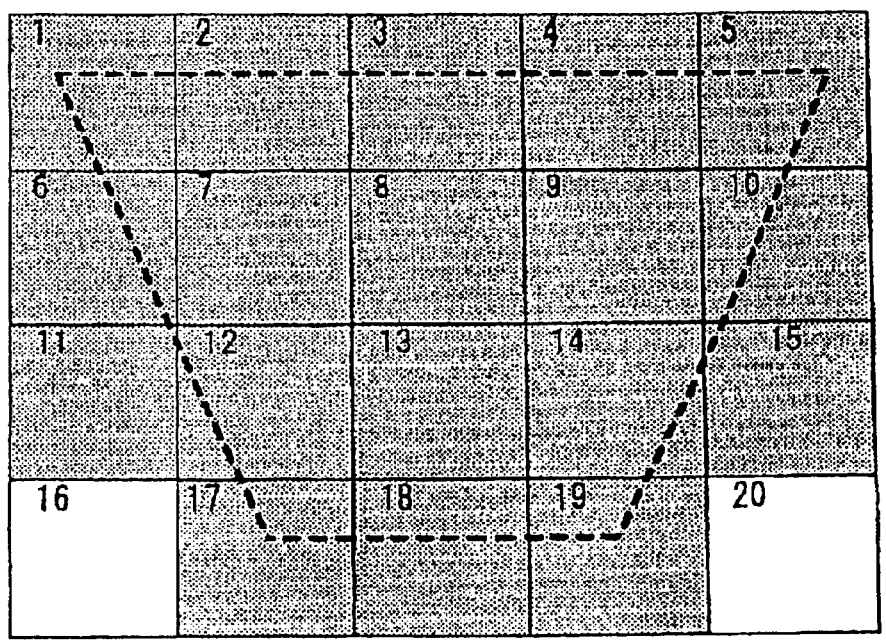
FIG. 9 is an explanatory view illustrating a condition of obtaining road map data included in the absolute coordinate of the reverse trapezoid coordinate shown in FIG. 8.

In the trapezoid conversion processing, the reading amount of the map data in the y-axis direction does not change in contrast with the plane map. Accordingly for display of the map data in a more distance area, the compression ratio in the y-axis direction in the table is preliminarily determined and used to expand screen coordinates on the upper two points in the reverse trapezoid coordinates shown in FIG. 4 in the y-axis direction as shown in FIG. 7 thereby to read out the map data in a more distance area. For example, the Y-coordinate of the screen coordinates at the upper two points is divided by the compression ratio of 0.46 in the y-axis direction at the first step to determine a reverse trapezoid extent shown by dotted lines in FIG. 7. At the following processing, the coordinates at the four corners on the display screen shown in FIG. 7 is changed to absolute coordinates as shown in FIG. 8 to read out road map data included in a reverse trapezoid coordinate defined by the absolute coordinates. (see FIG. 9) The absolute coordinates in the read out road map data are changed to screen coordinates and multiplied by 0.46 in the y-axis direction. Thereafter, the screen coordinates are substituted for the foregoing formulas and converted to the trapezoid coordinates for display of the perspective view shown in FIG. 2(b). Thus, the trapezoid coordinate is indicated on the display screen of the display unit after memorized in the frame memory.

Figure 10:
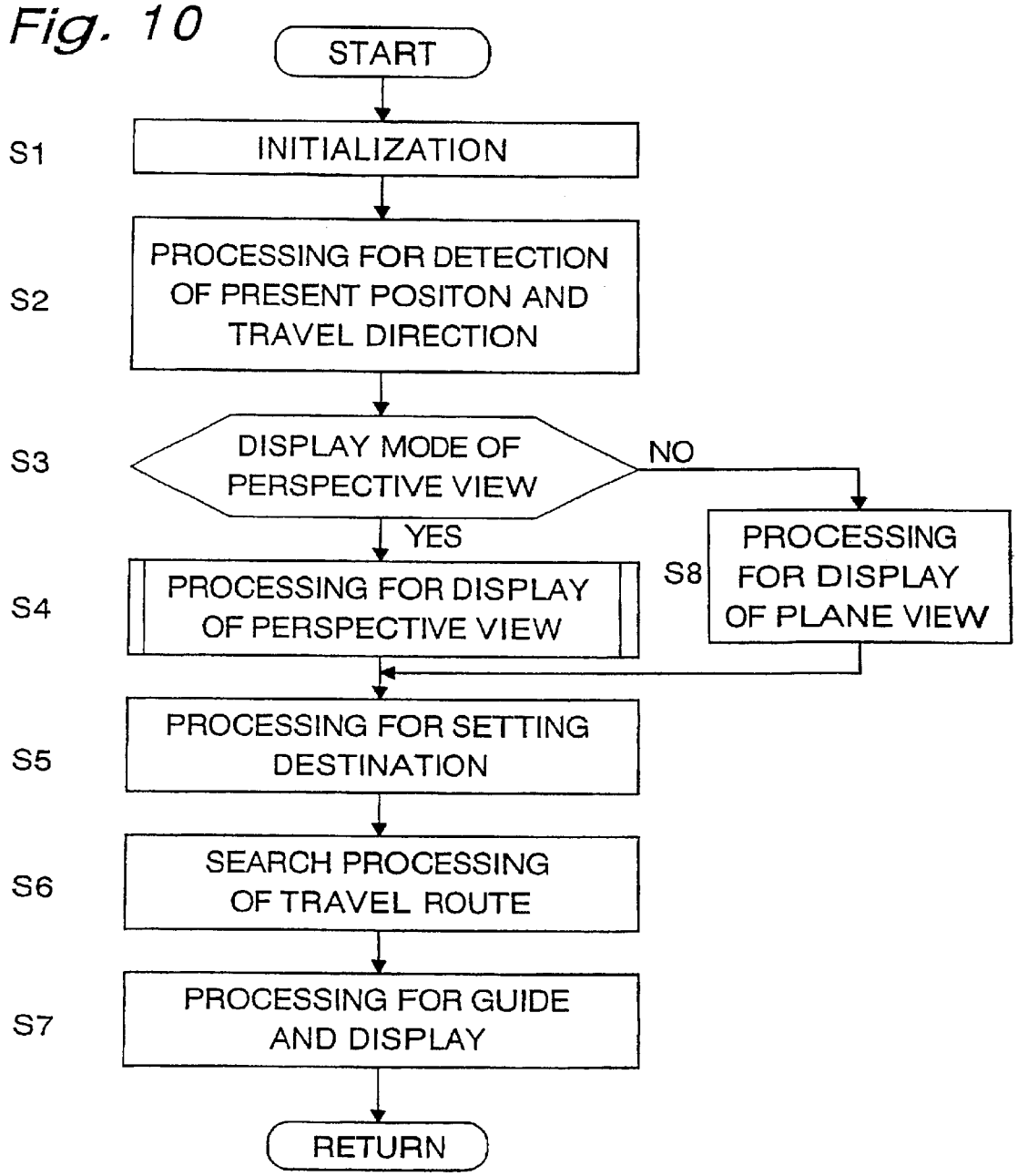
FIG. 10 is a flow chart of a program for display of a road map executed by a central processing unit shown in FIG. 1.

The central processing unit 4 executes processing of a program shown by a flow chart in FIGS. 10 and 11 as described hereinafter. Assuming that the input device 1 has been operated by a driver to display a road map in the form of a plane view on the screen of the display unit in a condition where the central processing unit 4 was activated by start of the navigation apparatus to initialize the program at step S1 in FIG. 10, the central processing unit 4 reads out at step S2 the road map data near the present position of the vehicle from the map information memory 3 in accordance with the present position and travel direction of the vehicle detected by the detection device 2 and converts the absolute coordinates of the read out road map data to screen coordinates thereby to display the screen coordinates on the screen of the display unit after memorized them in the frame memory. In this instance, the central processing unit 4 determines a "No" answer at step S3 in FIG. 10 and executes at step S8 processing of the road map data. Subsequently, the central processing unit 4 executes at step S5 processing for setting a destination based on data of a telephone number, an address, names of facilities, a registration spot or the like and executes at step S6 search processing of a travel route from the present position to the destination. At the following step S7, the central processing unit 4 executes processing for guide and display of the travel route.

Figure 11:
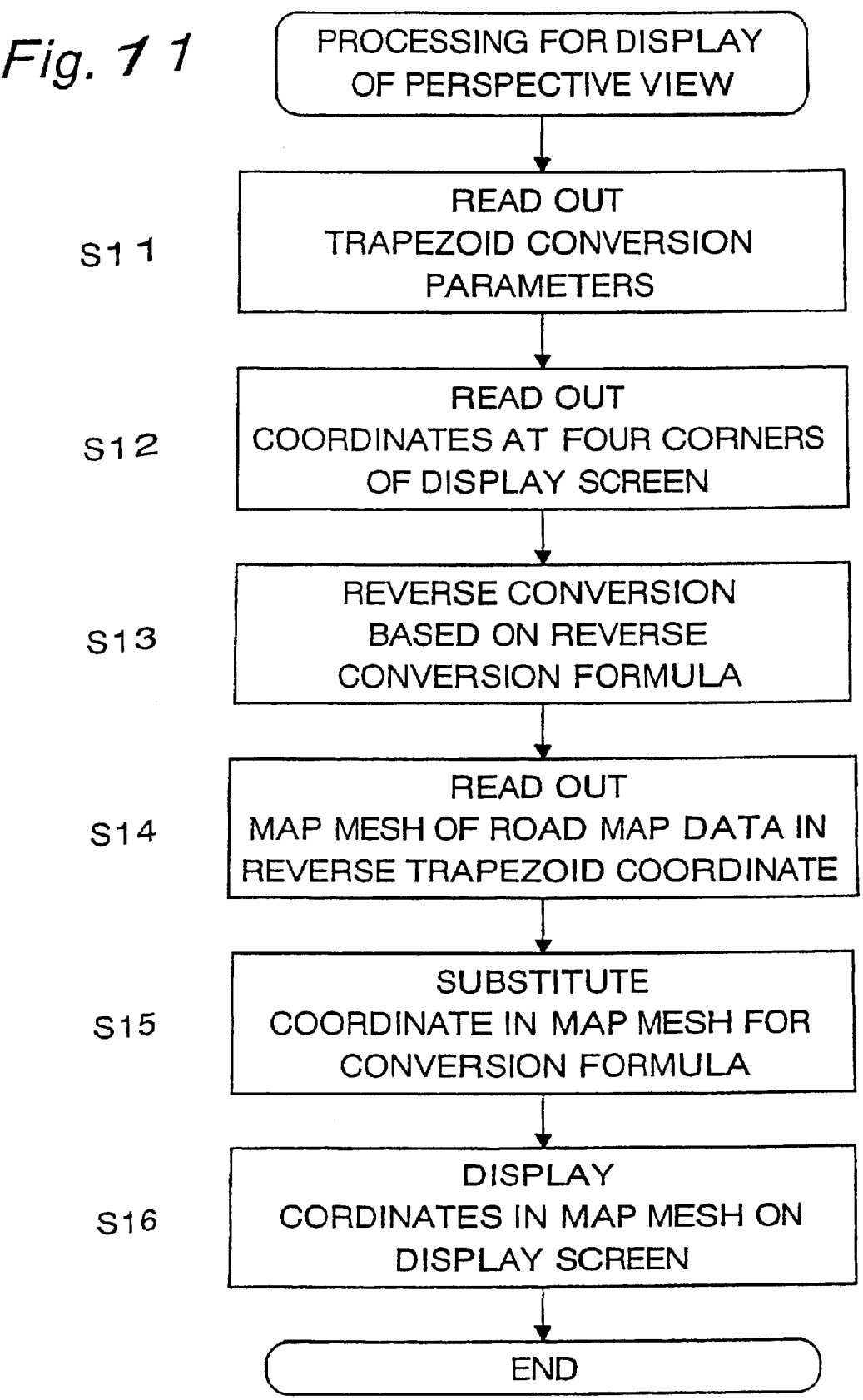
FIG. 11 is a flow chart of a program for display in the form of a perspective view shown in FIG. 10.

When the input device 1 is operated by the driver to select a display mode of a perspective view in such a condition described above, the central processing unit 4 determines a "Yes" answer at step S3 and causes the program to proceed to step S4 for display processing of a perspective view shown in FIG. 11. During the display processing of the perspective view, the central processing unit 4 reads out at step S11 predetermined trapezoid conversion parameters from the table and determines at step S12 a center of the display screen as a basis point of image display on a basis of absolute coordinates of the present position of the vehicle obtained from the detection device 2 to define coordinates at the four corners of the display screen. Subsequently, the central processing unit 4 calculates at step S13 coordinates at four corners of the screen on a basis of the reverse conversion formula defined by the trapezoid conversion parameters and determines a reverse trapezoid coordinate based on the calculated coordinates. Thus, the central processing unit 4 reads out at step S14 a map mesh of the road map data included in the reverse trapezoid coordinate from the map information memory 3 and changes at step S16 absolute coordinates in the map mesh to screen coordinates. Subsequently, the central processing unit 4 substitutes the screen coordinates for the foregoing conversion formula to convert them to a trapezoid coordinate for display of the perspective view and causes at step S16 the display unit to display thereon coordinates in the map mesh introduced into the trapezoid coordinate. Although in the above description, the basis point of image display is located at the center of the display screen, the basis point may be located at a lower portion of the display screen. With such arrangement of the basis point of image display, the road map in the travel direction of the vehicle can be widely indicated on the screen of the display unit.

As is understood from the above description, the road map display device according to the present invention includes a road map information memory 3 for memorizing road map data on a two-dimensional coordinate; detection means for detecting a present position and a travel direction of an automotive vehicle, read-out means for reading out the two-dimensional coordinate of the road map data from the information memory 3 based on the present position and travel direction of the vehicle detected by the detection means, and image display means for displaying the read out two-dimensional coordinate in the form of a plane view on a display screen, wherein the road map display apparatus comprises parameter memory means for memorizing trapezoid conversion parameters predetermined on a basis of a conversion formula for converting the two-dimensional coordinate of the road map data to a trapezoid coordinate for display of a perspective view in such a manner that an upper side of a square two-dimensional coordinate is contracted relatively to a lower side of the coordinate; and introduction means for obtaining the road map data included in a reverse trapezoid coordinate corresponding with a trapezoid coordinate defined by the trapezoid conversion parameters from the parameter memory means and for introducing the road map data into the trapezoid coordinate such that the road map data are displayed in the form of a perspective view on the screen of the image display means. In the road map display apparatus, the trapezoid conversion parameters are preliminarily determined on a basis of the above conversion formula and stored in a table so that the two-dimensional coordinate obtained from the road map data can be converted to the trapezoid coordinate for display of the perspective view in a simple manner and that the road map data memorized in the road map information memory 3 can be rapidly displayed in the form of a perspective view superior in perspective.

What is claimed is:

1. A road map display apparatus including,a road map information memory for memorizing road map data on a two-dimensional coordinate, detection means for detecting a present position and a travel direction of an automotive vehicle, read out means for reading out the two-dimensional coordinate of the road map from the information memory in accordance with the present position and travel direction of the vehicle detected by the detection means, and image display means for displaying the read out two-dimensional coordinate in the form of a plane view on a screen, wherein coordinate conversion means is provided to convert a square two-dimensional coordinate to a trapezoid coordinate for display of a perspective view on a two-dimensional plane in such a manner that an upper side of the two-dimensional coordinate is appropriately contracted relatively to a lower side of the two-dimensional coordinate, and wherein the read-out means is arranged to read out the two-dimensional coordinate of the road map data corresponding with a perspective view to be displayed on the screen of the image display means, wherein the coordinate conversion means is arranged to convert the two-dimensional coordinate read out by the read-out means to the trapezoid coordinate, and wherein the image display means is arranged to display the converted trapezoid coordinate in the form of a perspective view on the screen.

2. A road map display apparatus including a road map information memory for memorizing road map data on a two-dimensional coordinate; detection means for detecting a present position and a travel direction of an automotive vehicle, read-out means for reading out the two-dimensional coordinate of the road map data from the information memory in accordance with the present position and travel direction of the vehicle detected by the detection means, and image display means for displaying the read out two-dimensional coordinate in the form of a plane view on a display screen, wherein the road map display apparatus comprises parameter memory means for memorizing trapezoid conversion parameters preliminarily determined on a basis of a conversion formula for converting the two-dimensional coordinate of the road map data to a trapezoid coordinate for display of a perspective view in such a manner that an upper side of a square two-dimensional coordinate is contracted relatively to a lower side of the coordinate; and introduction means for obtaining the road map data included in a reverse trapezoid coordinate corresponding with a trapezoid coordinate defined by the trapezoid conversion parameters from the parameter memory means and for introducing the road map data into the trapezoid coordinate such that the road map data are displayed in the form of a perspective view on the screen of the image display means.

3. A road map display apparatus including a road map information memory for memorizing road map data on a two-dimensional coordinate, detection means for detecting a present position and a travel direction of an automotive vehicle, read-out means for reading out the two-dimensional coordinate of the road map from the information memory in accordance with the present position and travel direction of the vehicle detected by the detection means, and image display means for displaying the read out two-dimensional coordinate in the form of a plane view on a screen, wherein coordinate conversion means is provided to convert a square two-dimensional coordinate to a trapezoid coordinate for display of a perspective view on a two-dimensional plane in such a manner that an upper side of the two-dimensional coordinate is appropriately contracted relatively to a lower side of the two-dimensional coordinate in a condition where a diagonal line connecting one end of the upper side of the two-dimensional coordinate to the other end of the lower side of the two-dimensional coordinate is retained straight, wherein the read-out means is arranged to read out the two-dimensional coordinate of the road map data corresponding with a perspective view to be displayed on the screen of the image display means and wherein the coordinate conversion means is arranged to convert the two-dimensional coordinate read out by the read-out means to the trapezoid coordinate so that the image display means displays the converted trapezoid coordinate in the form of a perspective view on the screen.

4. A road map display apparatus including a road map information memory for memorizing road map data on a two-dimensional coordinate; detection means for detecting a present position and a travel direction of an automotive vehicle, read-out means for reading out the two-dimensional coordinate of the road map data from the information memory in accordance with the present position and travel direction of the vehicle detected by the detection means, and image display means for displaying the read out two-dimensional coordinate in the form of a plane view on a display screen, wherein the road map display apparatus comprises parameter memory means for memorizing trapezoid conversion parameters preliminarily determined on a basis of a conversion formula for converting the two-dimensional coordinate of the road map data to a trapezoid coordinate for display of a perspective view in such a manner that an upper side of a square two-dimensional coordinate is contracted relatively to a lower side of the coordinate in a condition where a diagonal line connecting one end of the upper side of the two-dimensional coordinate to the other end of the lower side of the two-dimensional coordinate is retained straight; and introduction means for obtaining the road map data included in a reverse trapezoid coordinate corresponding with a trapezoid coordinate defined by the trapezoid conversion parameters from the parameter memory means and for introducing the road map data into the trapezoid coordinate such that the road map data are displayed in the form of a perspective view on the screen of the image display means.

5. A record media adapted for use in a road map display apparatus including a road map information memory for memorizing road map data on a two-dimensional coordinate; detection means for detecting a present position and a travel direction of an automotive vehicle, read-out means for reading out the two-dimensional coordinate of the road map data from the information memory in accordance with the present position and travel direction of the vehicle detected by the detection means and image display means for displaying the read out two-dimensional coordinate in the form of a plane view on a display screen, wherein the record media is programmed to determine trapezoid conversion parameters on a basis of a conversion formula for converting the two-dimensional coordinate of the road map data to a trapezoid coordinate for display of a perspective view in such a manner that an upper side of a square two-dimensional coordinate is contracted relatively to a lower side of the coordinate and to read out the road map data included in a reverse trapezoid coordinate corresponding with a trapezoid coordinate defined by the trapezoid conversion parameters from the parameter memory means for introducing the road map data into the trapezoid coordinate such that the road map data are displayed in the form of a perspective view on the screen of the image display means.

6. A record media adapted for use in a road map display device apparatus including a road map information memory for memorizing road map data on a two-dimensional coordinate; detection means for detecting a present position and a travel direction of an automotive vehicle, read out means for reading out the two-dimensional coordinate of the road map data from the information memory in accordance with the present position and travel direction of the vehicle detected by the detection means, and image display means for displaying the read out two-dimensional coordinate in the form of a plane view on a display screen, wherein the record media is programmed to determine trapezoid conversion parameters on a basis of a conversion formula for converting the two-dimensional coordinate of the road map data to a trapezoid coordinate for display of a perspective view in such a manner that an upper side of a square two-dimensional coordinate is contracted relatively to a lower side of the coordinate in a condition where a diagonal line connecting one end of the upper side of the two-dimensional coordinate to the other end of the lower side of the two-dimensional coordinate is retained straight and to read out the road map data included in a reverse trapezoid coordinate defined by a reverse conversion formula of said conversion formula and to introduce the road map data into the trapezoid coordinate defined by the trapezoid conversion parameters such that the road map data are displayed in the form of a perspective view on the screen of the image display means.

7. A road map display apparatus as claimed in claim 4, wherein the parameter memory means is provided to memorize a plural steps of trapezoid conversion parameters determined on a basis of the conversion formula and wherein the introduction means is provided to obtain the road map data included in a reverse trapezoid coordinate corresponding with a trapezoid coordinate defined by the trapezoid parameters selectively read out from the parameter memory means and to introduce the road map data into the trapezoid coordinate.

8. A road map display apparatus as claimed in claim 4, wherein the plural steps of trapezoid conversion parameters are preliminarily determined on a basis of the conversion formula in such a manner that the diagonal line is retained straight on a basis of a ratio of a pair of upper and lower triangles defined by the diagonal line and a y-axis intersecting an x-axis at its appropriately divided positions.

9. A road map display apparatus as claimed in claim 4, wherein the trapezoid conversion parameters are determined on a basis of the following conversion formula.

$$sy = \frac{b \cdot L \cdot Y}{a \cdot L + (b-a)Y}$$

$$sx = \frac{X}{g}\left\{b - \frac{sy}{L}(b-a)\right\}$$

in which:
   a: Half of the upper side of the trapezoid coordinate
   b: Half of the lower side of the trapezoid coordinate
   L: Height of the trapezoid coordinate
   X: The x-coordinate of the square two-dimensional coordinate
   Y: The y coordinate of the square two-dimensional coordinate
   sx: The x-coordinate after conversion
   sy: The y-coordinate after conversion
   g: Half of the lateral width of the trapezoid coordinate at a basis height.

\* \* \* \* \*